UNITED STATES PATENT OFFICE.

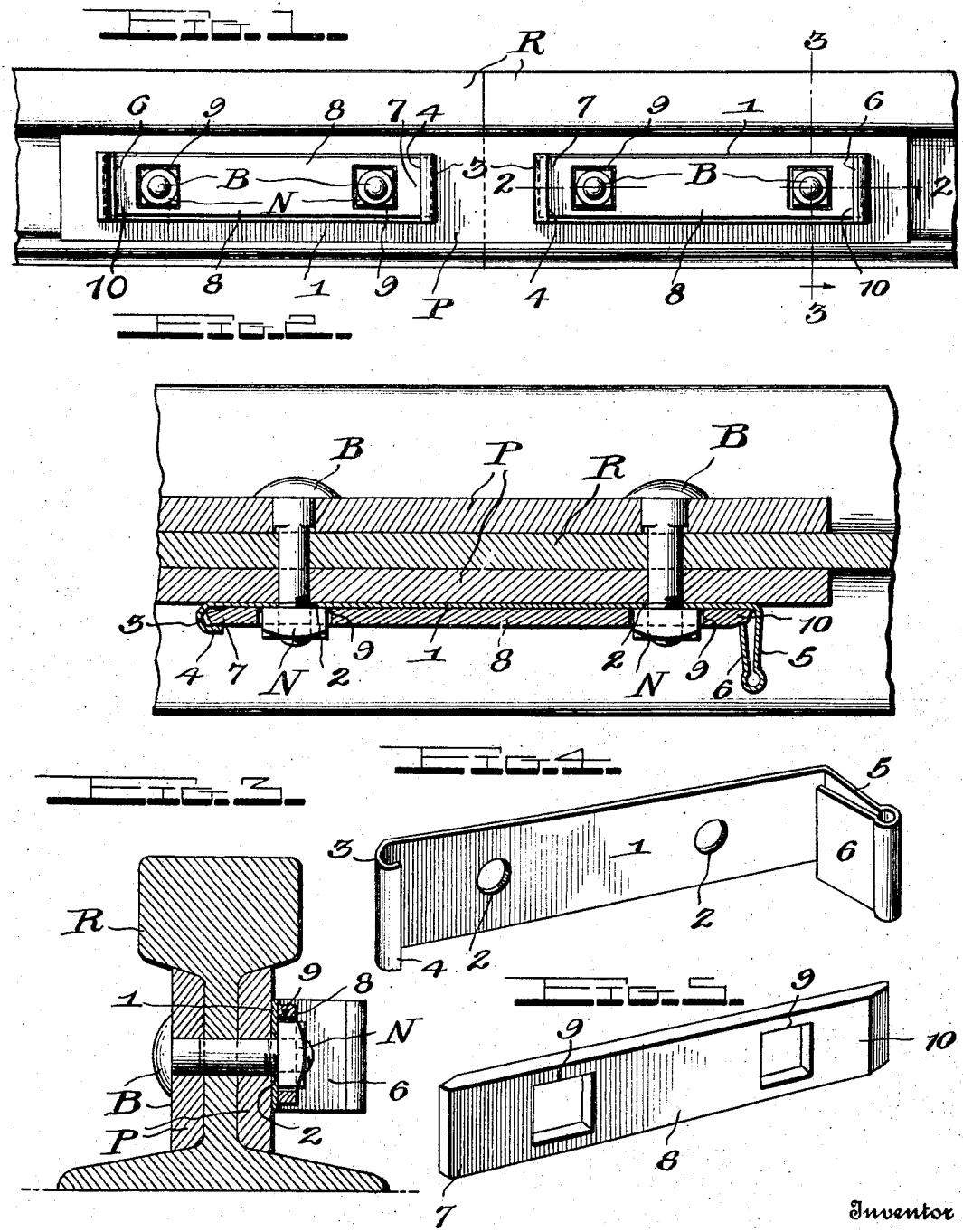

LEONARD BURRY, OF NEOGA, ILLINOIS.

NUT-LOCK.

1,172,580.  Specification of Letters Patent. Patented Feb. 22, 1916.

Application filed February 15, 1915. Serial No. 8,252.

*To all whom it may concern:*

Be it known that I, LEONARD BURRY, a citizen of the United States, residing at Neoga, in the county of Cumberland and State of Illinois, have invented certain new and useful Improvements in Nut-Locks; and I do declare the following to be a full, clear, and exact description of the invention, such as will enable others skilled in the art to which it appertains to make and use the same.

My invention relates broadly to improvements in nut locks and more particularly to those designed for locking the nuts used in connecting rails, although the invention need not be limited to this use.

The object of the invention is to provide a comparatively simple and inexpensive nut lock which may be very easily applied and which will effectively lock the nuts against rotation.

With this main object in view, the invention resides in certain novel features of construction and combination hereinafter described and claimed and shown in the drawings wherein:

Figure 1 is a side elevation of the meeting ends of a pair of rails, showing the application of my invention in locking the nuts used at the joint; Fig. 2 is a horizontal section as seen along the plane of the line 2—2 of Fig. 1; Fig. 3 is a vertical transverse section taken along the plane of the line 3—3 of Fig. 1; Fig. 4 is a perspective view of the washer plate and parts carried thereby, and Fig. 5 is a similar view of the locking plate.

In this drawing, constituting a part of the application, a pair of rails R are shown as connected by a pair of fish plates P through which and through the webs of the rails the usual bolts B are passed, said bolts being equipped with nuts N. As heretofore suggested, it is the object of the present invention to lock these nuts N against rotation. In accomplishing this result, I employ a washer plate 1 having a plurality of openings 2 to receive the threaded ends of the bolts B, this washer plate being of any appropriate length and having the desired number of openings 2. In the present case, the plate 1 is shown as provided with but two of such openings, but it will be evident that a greater number could well be used. One end of the plate 1 is bent substantially upon itself as seen at 3 to provide an overhanging lip or keeper 4, while the opposite end thereof is bent laterally at 5 and is then again continued inwardly to form a resilient tongue 6, this tongue being disposed transversely of the plate 1 and having its free end spaced outwardly therefrom as shown.

With the parts constructed and arranged as above described, one end 7 of a locking plate 8 is disposed behind the keeper 4, said end being beveled on its inner side whereby it may be inserted into said keeper only when disposed at an angle to the washer plate. The plate 8 is then moved inwardly to allow a pair of openings 9 with which it is provided, to receive the nuts N, thus preventing rotation thereof. During this inward movement of the plate 8, the lip or keeper 4 will be sprung outwardly to a slight extent, thus insuring that it will always contact with said plate to prevent rattling and, when the remaining end 10 of said plate is snapped behind the tongue 6, said plate will be rigidly yet removably held in place until the tongue 6 is released from its engagement therewith, after which the latter may be readily removed for the purpose of allowing the nuts N to be likewise removed.

It is to be observed that the end 10 is beveled on its outer side for contact with the inner end of the tongue 6, whereby the tendency of the latter to spring to normal position, will be exerted against such bevel to always force the plate 8 against the washer plate 1. Necessarily, in order for the device to operate as stated, the plate 8 must be greater in thickness than the distance between the tongue 6 and the plate 1 and between said plate and the keeper 4.

From the foregoing description, taken in connection with the accompanying drawings, it will be seen that a very simple device has been provided for preventing rotation of the nuts, that such device may be easily and cheaply manufactured, and that it will readily perform the functions for which it is designed, these features being salient in a device of this character.

I have described but one of the devices for locking the nuts and, in fact, have illustrated the details of but one of these devices, it being clearly understood, however, that one or any number of locks may be provided. As suggestive of one manner in which the locks may be disposed, however, Fig. 1 shows two of the same employed for locking four nuts.

The foregoing is deemed sufficient to convey a clear understanding of the invention to those skilled in the art to which the invention relates.

I claim:

The combination with a bolt and a nut thereon, of a resilient washer plate contacting with the inner end of the nut and having an opening receiving the bolt, one end of said plate being bent outwardly upon itself to form a resilient keeper opening toward the other end of the plate, said last named end being bent laterally outward and then folded inwardly toward the keeper into slightly oblique relation with the plate to form a spring tongue whose inner end is spaced from said plate, and a rigid apertured nut locking plate greater in thickness than the distance between the keeper and the washer plate and between the tongue and said washer plate, one end of said locking plate being beveled on its inner side whereby it may be inserted into the keeper only when disposed at an angle to the washer plate to place said keeper under tension when the locking plate is moved toward said washer plate to snap its other end behind the spring tongue, said last named end being beveled on its outer side for contact with the inner end of said tongue, whereby the tendency of the latter to spring to normal position will be exerted against such bevel to force the locking plate into contact with the washer plate.

In testimony whereof I have hereunto set my hand in presence of two subscribing witnesses.

LEONARD BURRY.

Witnesses:
G. BURTON,
EDGAR W. ROCKEL.